United States Patent [19]

Kang

[11] Patent Number: 5,771,119
[45] Date of Patent: Jun. 23, 1998

[54] REAL-IMAGE VARIABLE MAGNIFICATION VIEWFINDER

[75] Inventor: Hyoung-won Kang, Syeongsangnam-do, Rep. of Korea

[73] Assignee: Samsung Aerospace Industries, Ltd., Kyeongsangnam-do, Rep. of Korea

[21] Appl. No.: 777,325

[22] Filed: Dec. 27, 1996

[30] Foreign Application Priority Data

Dec. 28, 1995 [KR] Rep. of Korea ...................... 95-61842

[51] Int. Cl.[6] .............................. G02B 27/02; G03B 13/10
[52] U.S. Cl. ........................... 359/432; 359/422; 359/431; 396/379
[58] Field of Search ............................ 359/362, 420–423, 359/431–433, 676, 678, 686–687; 396/373–386

[56] References Cited

U.S. PATENT DOCUMENTS

| 3,250,195 | 5/1966 | Mashauis | 359/431 |
| 5,168,402 | 12/1992 | Mihara | 359/687 |
| 5,193,030 | 3/1993 | Nozaki et al. | 359/687 |
| 5,448,400 | 9/1995 | Kikuchi et al. | 359/422 |

FOREIGN PATENT DOCUMENTS

| 168408 | 6/1992 | Japan | 359/432 |
| 5-93863 | 4/1993 | Japan . | |
| 6-102454 | 4/1994 | Japan . | |
| 611976 | 8/1994 | WIPO | 359/432 |

*Primary Examiner*—Thong Nguyen
*Attorney, Agent, or Firm*—Finnegan, Henderson, Farabow, Garrett & Dunner, L.L.P.

[57] ABSTRACT

A real-image variable magnification viewfinder includes, from the object side, an objective lens group of an overall positive power, including a first lens unit of a positive refractive power, a second lens unit of a negative refractive power, a third lens unit of a positive refractive power, and a fourth lens unit of a positive refractive power. The objective lens group forms an actual image of an object. The viewfinder also includes a reverse lens group for reversing an image formed by the objective lens group, and an eyepiece lens group for observing an image reversed by the reverse lens group.

2 Claims, 6 Drawing Sheets

Wide Angle Position
Spherical Aberration

Astigmatism

Distortion

Middle Angle Position
Spherical Aberration

Astigmatism

Distortion

Spherical Aberration

Telephoto Position

Astigmatism

Distortion

Spherical Aberration

Wide Angle Position

Astigmatism

Distortion

FIG.6A Spherical Aberration — Middle Angle Position
FIG.6B Astigmatism
FIG.6C Distortion
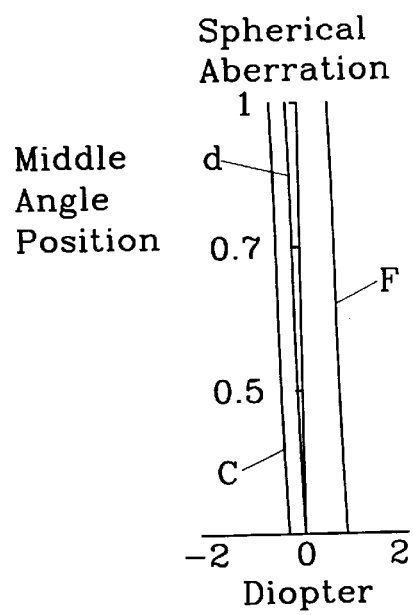
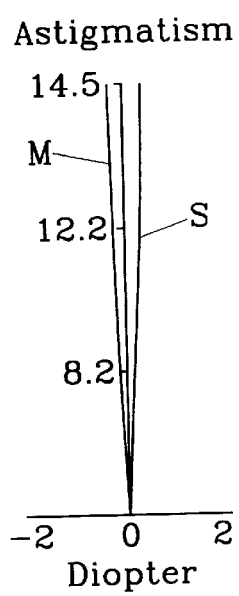
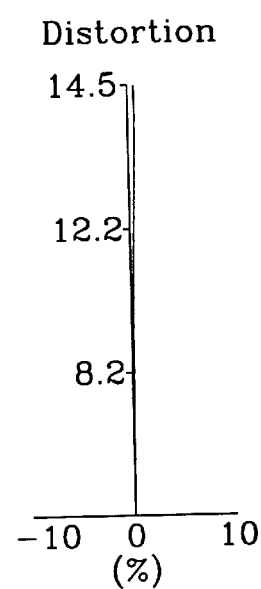
FIG.7A Spherical Aberration — Telephoto Position
FIG.7B Astigmatism
FIG.7C Distortion
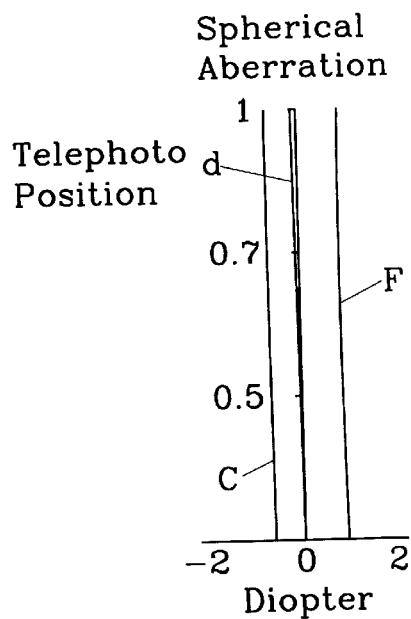
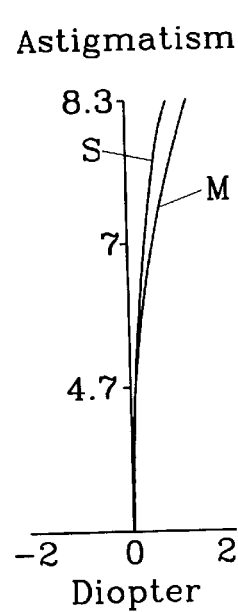
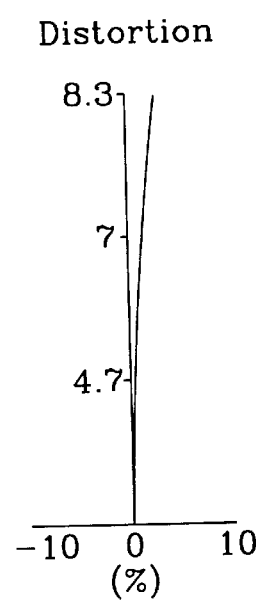

Spherical Aberration
Wide Angle Position

Astigmatism

Distortion

Spherical Aberration
Middle Angle Position

Astigmatism

Distortion

Spherical Aberration
Telephoto Position

Astigmatism

Distortion

REAL-IMAGE VARIABLE MAGNIFICATION VIEWFINDER

BACKGROUND OF THE INVENTION

(1) Field of the Invention

The present invention relates to a real-image variable magnification viewfinder and, more particularly, to a real-image variable magnification viewfinder capable of performing high power variable magnification with a compact construction for improving productivity.

(2) Description of the Prior Art

Conventionally, most compact cameras employ a virtual image viewfinder such as an Albada viewfinder or a reverse Galilean viewfinder. These viewfinders provide a relatively wide angle of view and have a compact construction because a prism is not required to erect the image. However, in these viewfinders, a lens closest to an object must be large, and the view field of the viewfinder blurs in a marginal zone.

Recently, because of the above mentioned drawbacks in virtual image viewfinders, real image viewfinders have been used in their place. Therefore, real image viewfinders are better suited for developing a photographic optical system of a compact camera with a wide angle view.

Conventional real-image variable magnification viewfinders meeting the above-mentioned requirements are disclosed in the Japanese Patent Laid-open Nos. 94-102454 and 93-93863. Japanese Patent Laid-open No. 94-102054 proposes a real-image variable magnification viewfinder which comprises an objective lens group including a first lens unit of a positive refractive power, a second lens unit of a negative refractive power, a third lens unit of a positive refractive power, and a fourth lens unit of a positive refractive power wherein the magnification is changed by moving the second and third lens units. However, the real-image variable magnification viewfinder according to the Japanese Patent Laid-open No. 94-102054 suffers from several problems including a very small curvature radius and a very short distance between the moving lens and a fixed lens, resulting in lower productivity and more complex construction.

Japanese Patent Laid-open No. 93-93863 proposes a real-image variable magnification viewfinder which comprises an objective lens group including a first lens unit of a positive refractive power, a second lens unit of a negative refractive power, a third lens unit of a positive refractive power, and a fourth lens unit of a positive refractive power; or an objective lens group including a first lens unit of a positive refractive power, a second lens unit of a negative refractive power, a third lens unit of a negative refractive power, and a fourth lens unit of a positive refractive power wherein the second and the third lens units are moved so that the magnification is changed and the aberration according to a variable magnification is compensated. However, the real-image variable magnification viewfinder proposed by Japanese Patent Laid-open No. 93-93863 suffers from the same problems as that of Japanese Patent Laid-open No. 94-102054.

In addition to the above-mentioned problems, according to the conventional real-image variable magnification viewfinder, it is difficult to obtain a magnification greater than a three times magnification.

SUMMARY OF THE INVENTION

In view of the prior art described above, a compact real-image variable magnification viewfinder, according to the present invention, is capable of performing variable magnification with a compact construction for improving productivity.

According to the present invention, as embodied and broadly described herein, a real-image variable magnification viewfinder comprises, on the object side, an objective lens group of an overall positive refractive power. The objective lens group includes a first lens unit of a positive refractive power, a second lens unit of a negative refractive power, a third lens unit of a positive refractive power, and a fourth lens unit of a positive refractive power. The objective lens group forms an actual image of an object and the second lens and the third lens units are moved along the optical axis of the viewfinder while the first and the fourth lens units are fixed when the magnification is changed from a wide angle position to a telephoto position. The viewfinder also comprises a reverse lens group for reversing the image formed by the objective lens group and an eyepiece lens group for observing the image reversed by the reverse lens group.

The real-image variable magnification viewfinder according to the present invention fulfills the following conditions;

$$0.6 < f_w/f_3 < 1.0 \tag{1}$$

$$18 < f_T < 33 \tag{2}$$

$$1.0 < L/f_4 < 2.1 \tag{3}$$

where $f_w$ represents the focal length of the objective lens group at a wide angle position, $f_3$ represents the focal length of the third lens unit, $f_T$ represents the focal length of the objective lens group at a telephoto position, L represents the distance between the surface to the object of the first lens of the objective lens group and an image plane, and $f_4$ represents the focal length of the fourth lens unit.

BRIEF DESCRIPTION OF THE DRAWINGS

The above advantages and features, according to the present invention, will be apparent from the following description of the preferred embodiment with reference to the accompanying drawings.

FIGS. 6A to 6C illustrate the aberration curves of the second embodiment at a middle position.

FIGS. 7A to 7C illustrate the aberration curves of the second embodiment at a telephoto position.

DETAILED DESCRIPTION OF THE PREFERRED EMBODIMENTS

The present invention will be described in detail with reference to the accompanying drawings. Whenever possible, the same reference numbers will be used throughout the drawings to refer to the same or like parts.

Figure 1A:
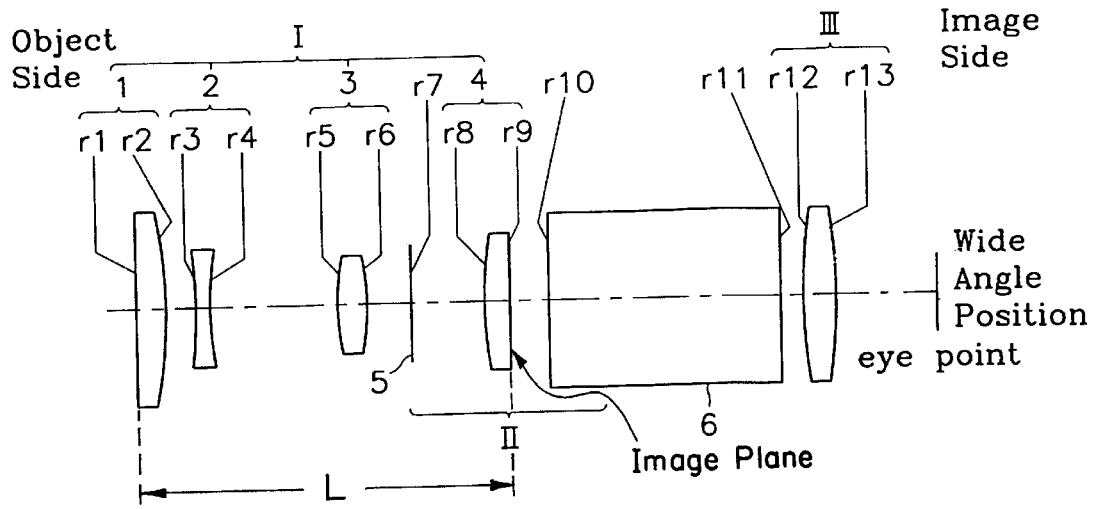
FIGS. 1A to 1C are sectional views of a real-image variable magnification viewfinder according to a first embodiment of the present invention, at a wide angle, middle and a telephoto position respectively.
Figure 1B:
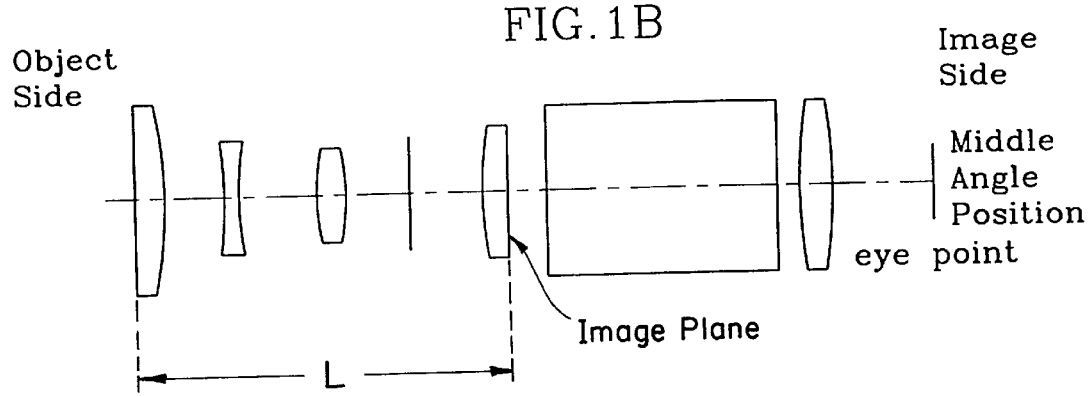
Figure 1C:
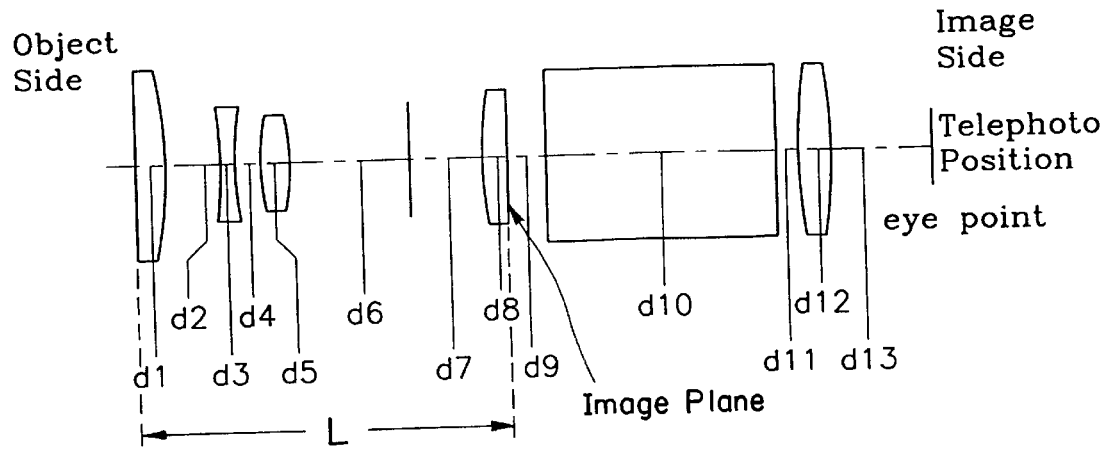
Figure 2A:
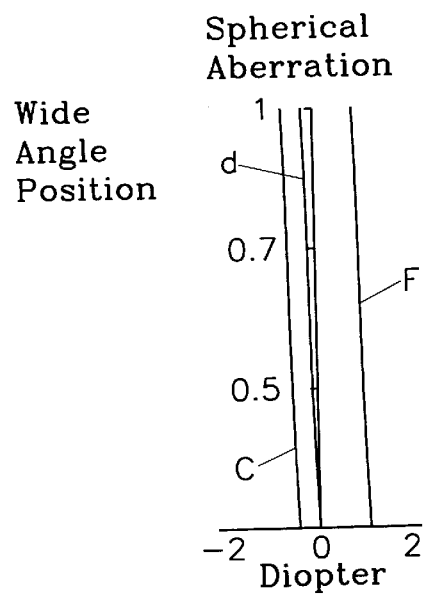
FIGS. 2A to 2C illustrate the aberration curves of the first embodiment at a wide angle position.
Figure 2B:
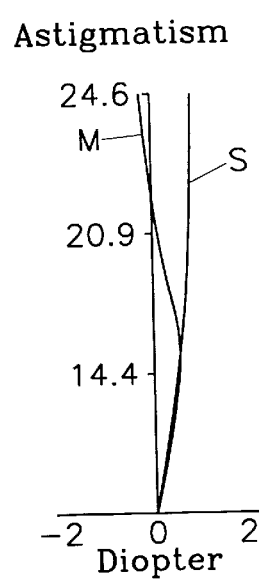
Figure 2C:
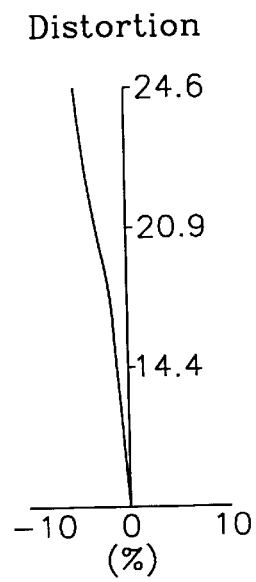
Figure 3A:
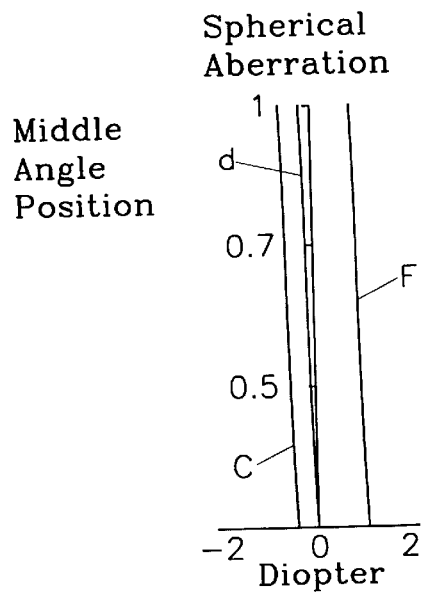
FIGS. 3A to 3C illustrate the aberration curves of the first embodiment at a middle position.
Figure 3B:
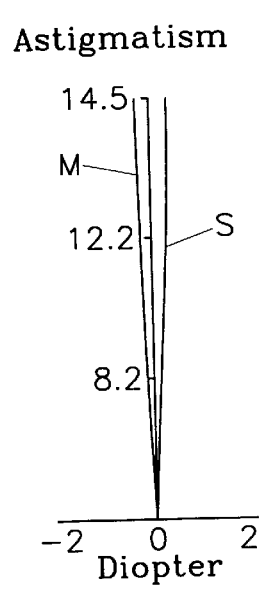
Figure 3C:
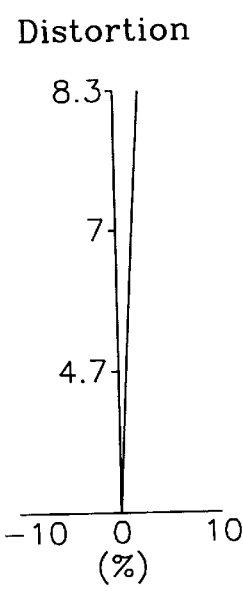
Figure 4A:
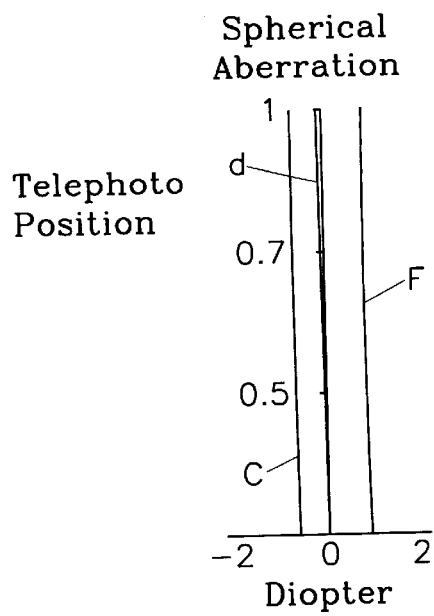
FIGS. 4A to 4C illustrate the aberration curves of the first embodiment at a telephoto position.
Figure 4B:
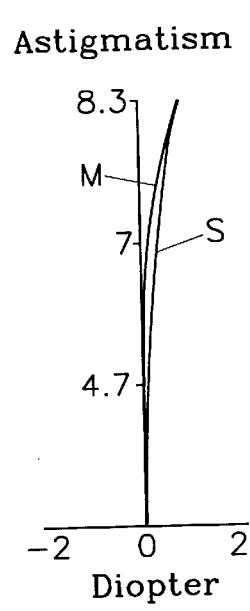
Figure 4C:
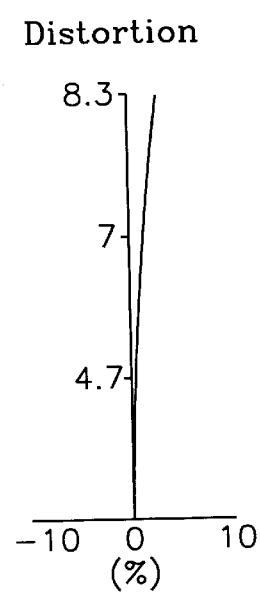
Figure 5A:
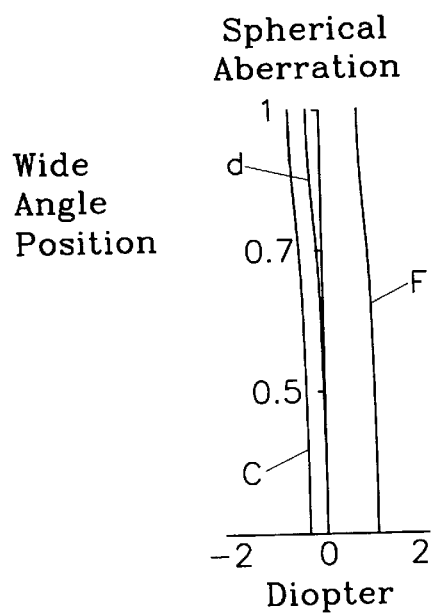
FIGS. 5A to 5C illustrate the aberration curves of the second embodiment at a wide angle position.
Figure 5B:
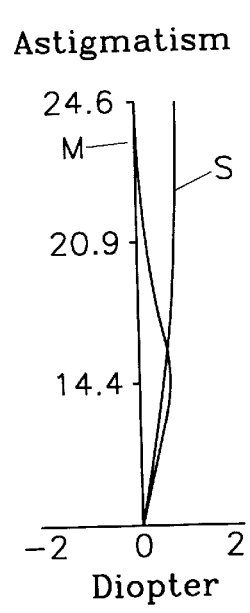
Figure 5C:
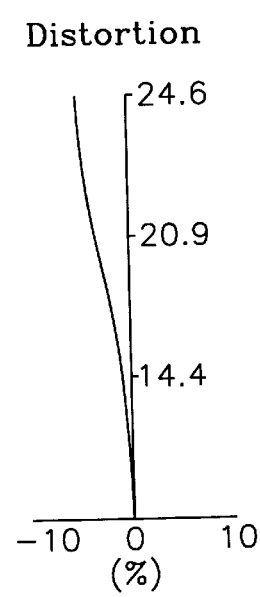
Figure 8A:
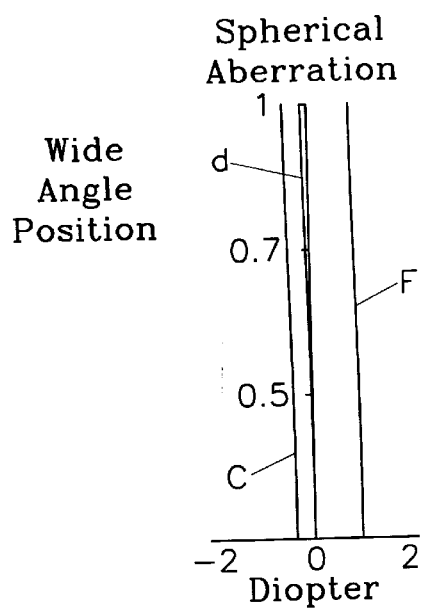
FIGS. 8A to 8C illustrate the aberration curves of the third embodiment at a wide angle position.
Figure 8B:
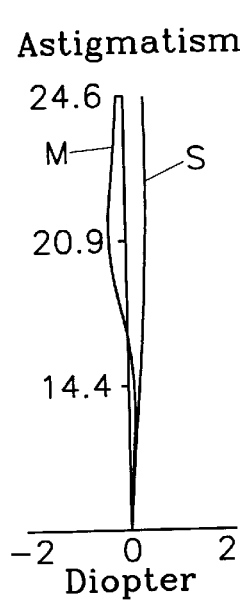
Figure 8C:
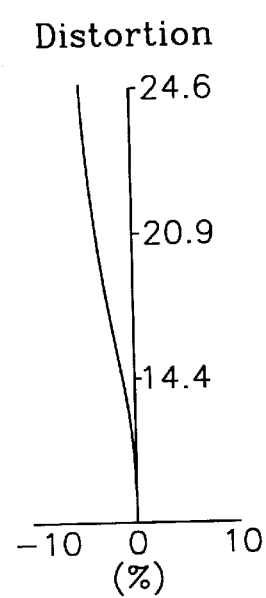
Figure 9A:
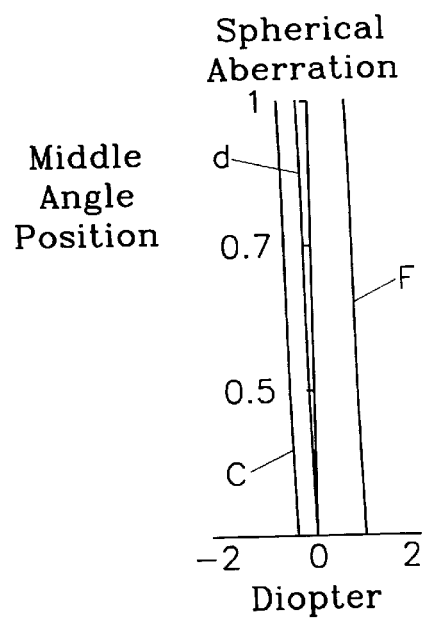
FIGS. 9A to 9C illustrate the aberration curves of the third embodiment at a middle position.
Figure 9B:
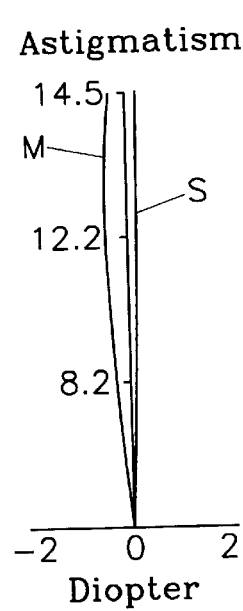
Figure 9C:
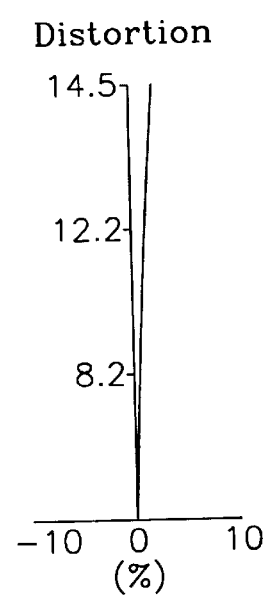
Figure 10A:
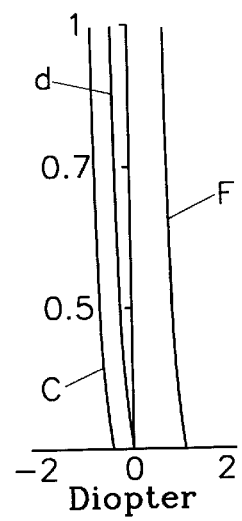
FIGS. 10A to 10C illustrate the aberration curves of the third embodiment at a telephoto position.
Figure 10B:
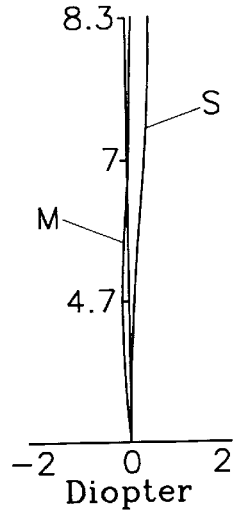
Figure 10C:
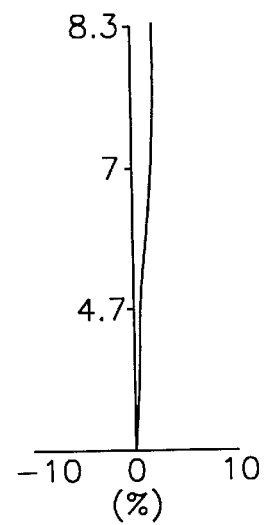

Referring to FIGS. 1A, 1B, and 1C, a real-image variable magnification viewfinder according to an embodiment of the present invention comprises an objective lens group I for forming an image, a reverse lens group II for reversing again the image reversed at 180° both in horizontal and vertical directions by the objective lens group I, and an eyepiece lens group III for observing the image reversed by reverse lens group II. The objective lens group I includes a fixed first lens unit 1 of a positive refractive power, a movable second lens unit 2 of a negative refractive power, a movable third lens unit 3 of a positive refractive power, and a fixed fourth lens unit 4 of a positive refractive power. The objective lens group I performs a variable magnification by moving the second lens unit 2 and the third lens unit 3 along the optical axis of the viewfinder. All lenses of the real-image variable magnification viewfinder according to the embodiment are plastic lenses.

The reverse lens group II comprises at least one mirror 5 and a prism 6. The mirror 5 is provided for reversing again the image reversed by the outer surface of fourth lens unit 4 of objective lens group I at 180° in a horizontal direction and the prism 6 is provided for reversing again the reversed image at 180° in a vertical direction. In FIG. 1A, r7 is a surface of mirror 5 which has a radius of curvature of ∞.

The operation of the real-image variable magnification viewfinder according to the embodiment of the present invention is as follows. The real-image variable magnification viewfinder according to the embodiment of the present invention fulfills the following condition:

$$0.6 < f_w/f_3 < 1.0 \qquad (1)$$

where $f_w$ represents the focal length of the objective lens group at a wide angle position, and $f_3$ represents the focal length of third lens unit 3.

If the upper limit of condition 1 is exceeded, the third lens unit 3 has a strong refractive power, thereby increasing a change of aberration when magnification is performed.

Furthermore, if the lower limit of condition 1 is not complied with, the fourth lens unit 4 has a strong refractive power while the third lens unit 3 has a weak refractive power. As a result, a chromatic aberration increases, and constructing a magnification greater than three times becomes more difficult.

In addition, the real-image variable magnification viewfinder according to the embodiment of the present invention fulfills the following condition:

$$18 < f_T < 33 \qquad (2)$$

where $f_T$ represents the focal length of the objective lens group at a telephoto position. If the upper limit of condition 2 is exceeded, the image magnification formed at the telephoto position makes obtaining a clear visual field and constructing the eyepiece lens group difficult. Moreover, if the lower limit of condition 2 is not complied with, the refractive power of the objective lens group makes constructing the objective lens group difficult. Even though it is possible to construct the objective lens group, the refractive power is added to every lens unit, thereby increasing the aberration of each lens.

Furthermore, the real-image variable magnification viewfinder according to the embodiment of the present invention fulfills the following condition:

$$1.0 < L/f_4 < 2.1 \qquad (3)$$

where L represents the distance between the surface to the object of the first lens of the objective lens group and an image plane, and $f_4$ represents the focal length of the fourth lens unit.

If the upper limit of condition 3 is exceeded, the fourth lens unit 4 has a strong refractive power such that a change is of aberration increases. In addition, providing a compact real-image variable magnification viewfinder becomes difficult.

Moreover, if the lower limit of condition 3 is not complied with, the third lens unit 3 has a strong refractive power, thereby increasing a chromatic aberration due to lens movement during magnification.

Each lens unit according to the embodiment of the present invention is made of low-priced plastic such as PMMA. In addition, the refractive power is properly divided into each lens group and aspherical lenses are properly used to provide simple construction.

The fourth lens unit 4 at the image side of the objective lens group has a flat-shaped outer surface making the display of the visual field and surveying distance easy. In addition, the mirror 5 of the reverse lens group II reverses the image in a horizontal direction, thereby dividing the load of the prism 6 for reversing the image in a vertical direction.

A coefficient of an aspherical lens of the real-image variable magnification viewfinder according to the embodiment which satisfies the above mentioned conditions 1, 2, and 3 is expressed by the following equation:

$$Z = \frac{Cy^2}{1 + \{1 - (K+1)C^2y^2\}^{1/2}} + A_4y^4 + A_6y^6 + A_8y^8 + A_{10}y^{10},$$

where Z represents the optical axial distance from the lens vertex, y represents the vertical distance of the optical axis, C represents the reciprocal of the curvature radius, K represents the conic number, and $A_4$ $A_6$, $A_8$ and $A_{10}$ represent aspherical coefficients.

Values which satisfy the above-mentioned conditions are described below. In the tables and figures, a curvature radius of a refractive surface is represented by $r_i$ (i=1~13), a lens thickness or a separation distance between lenses is represented by $d_i$ (i=1~13), a d-line refractive index of a lens is represented by Nd, an Abbe number of a lens is represented by v, a magnification of an overall optical system is represented by m, and a half viewing angle is represented by ω.

In FIGS. 2A, 3A, 4A, 5A, 6A, 7A, 8A, 9A, and 10A, spherical aberration is shown for "C", "d", and "F" wavelengths. C, d, and F refer to wavelengths for detecting a chromatic aberration generally used in the field of optical systems where F equals 486 nm, C equals 656 nm, and d, which is the basic wavelength in a camera lens, equals 588 nm.

FIGS. 2B, 3B, 4B, 5B, 6B, 7B, 8B, 9B, and 10B show astigmatism for S and M axes of rotation where S represents a digital ray referring to rays incident on the X axis of the lens, and M represents a meridional ray referring to rays incident on the Y axis of a lens.

Values for the first embodiment of the present invention are shown in Table 1 in which the viewing angle 2ω ranges from 49.3° to 16.7°, and the magnification m ranges from −0.36 to −1.09.

TABLE 1

| Surface number | Radius of curvature (r) | Thickness/ Separation (d) | Refractive Index (Nd) | Abbe number (v) |
|---|---|---|---|---|
| 1 | ∞ | 2.50 | 1.49176 | 57.4 |
| *2 | −16.950 | variable | | |
| 3 | −12.780 | 1.00 | 1.49176 | 57.4 |
| *4 | 9.330 | variable | | |
| *5 | 12.180 | 3.24 | 1.49176 | 57.4 |
| 6 | −12.040 | variable | | |
| 7 | ∞ | 11.00 | | |
| 8 | 12.930 | 4.50 | 1.49176 | 57.4 |
| 9 | ∞ | 4.80 | | |
| 10 | ∞ | 25.40 | 1.49176 | 57.4 |
| 11 | ∞ | 2.48 | | |
| *12 | 24.270 | 2.70 | 1.49176 | 57.4 |
| 13 | −24.440 | 17.00 (EP) | | |
| 14 | ∞ | 0.00 | | | where * indicates an aspherical surface.

In the first embodiment of the present invention, the above-mentioned distances between lenses and the coefficient of the aspherical surface vary according to a view angle as shown in Table 2.

TABLE 2

| | $2\omega = 49.3°$ | $2\omega = 28.0°$ | $2\omega = 16.7°$ |
|---|---|---|---|
| d2 | 2.575 | 7.476 | 6.254 |
| d4 | 17.436 | 10.047 | 2.866 |
| d6 | 4.750 | 7.237 | 15.635 |

| | aspherical coefficient of the 2nd surface | | aspherical coefficient of the 4th surface | |
|---|---|---|---|---|
| K  | 0.1449415552690E | +1 | −0.5149814004095E | +1 |
| A4 | 0.1600382072755E | −3 | 0.0000000000000 | |
| A6 | 0.0000000000000 | | 0.0000000000000 | |
| A8 | 0.0000000000000 | | 0.0000000000000 | |
| A10| 0.0000000000000 | | 0.0000000000000 | |

| | aspherical coefficient of the 5th surface | | aspherical coefficient of the 12th surface | |
|---|---|---|---|---|
| K  | −0.7739281205081E | +1 | −0.6417304855382E | +1 |
| A4 | 0.9930074927172E | −4 | 0.0000000000000 | |
| A6 | −0.1734781045049E | −5 | 0.0000000000000 | |
| A8 | 0.0000000000000 | | 0.0000000000000 | |
| A10| 0.0000000000000 | | 0.0000000000000 | |

Values for the second embodiment of the present invention are shown in Table 3 in which the viewing angle 2ω ranges from 49.3° to 16.7°, and the magnification m ranges from −0.32 to −0.97.

TABLE 3

| Surface number | Radius of curvature (r) | Thickness/ Separation (d) | Refractive Index (Nd) | Abbe number (v) |
|---|---|---|---|---|
| 1 | ∞ | 2.50 | 1.49176 | 57.4 |
| *2 | −16.129 | variable | | |
| 3 | −12.285 | 1.00 | 1.49176 | 57.4 |
| *4 | 8.714 | variable | | |
| *5 | 12.439 | 3.03 | 1.49176 | 57.4 |
| 6 | −11.753 | variable | | |
| 7 | ∞ | 11.00 | | |
| 8 | 11.100 | 4.50 | 1.49176 | 57.4 |
| 9 | ∞ | 4.80 | | |
| 10 | ∞ | 25.40 | 1.49176 | 57.4 |
| 11 | ∞ | 2.55 | | |

TABLE 3-continued

| Surface number | Radius of curvature (r) | Thickness/ Separation (d) | Refractive Index (Nd) | Abbe number (v) |
|---|---|---|---|---|
| *12 | 26.842 | 3.00 | 1.49176 | 57.4 |
| 13 | −22.671 | 17.00 (EP) | | |
| 14 | ∞ | 0.00 | | | where * indicates an aspherical surface.

In the second embodiment of the present invention, the above-mentioned distances between lenses and the coefficient of the aspherical surface vary according to a view angle as shown in Table 4.

TABLE 4

| | $2\omega = 49.3°$ | $2\omega = 29.0°$ | $2\omega = 16.7°$ |
|---|---|---|---|
| d2 | 1.800 | 6.524 | 5.724 |
| d4 | 18.417 | 11.299 | 4.087 |
| d6 | 4.750 | 7.149 | 15.221 |

| | aspherical coefficient of the 2nd surface | | aspherical coefficient of the 4th surface | |
|---|---|---|---|---|
| K  | 0.1187186340360E | +1 | −0.5376611094683E | +1 |
| A4 | 0.1771692856939E | −1 | 0.0000000000000 | |
| A6 | 0.0000000000000 | | 0.0000000000000 | |
| A8 | 0.0000000000000 | | 0.0000000000000 | |
| A10| 0.0000000000000 | | 0.0000000000000 | |

| | aspherical coefficient of the 5th surface | | aspherical coefficient of the 12th surface | |
|---|---|---|---|---|
| K  | −0.8348755688577E | +1 | −0.1119761955561E | +2 |
| A4 | 0.1214176906207E | −3 | 0.0000000000000 | |
| A6 | −0.2638566830767E | −5 | 0.0000000000000 | |
| A8 | 0.0000000000000 | | 0.0000000000000 | |
| A10| 0.0000000000000 | | 0.0000000000000 | |

Values for the third embodiment of the present invention are shown in Table 5 in which the viewing angle 2ω ranges from 49.30° to 16.7°, and the magnification m ranges from −0.38 to −1.15.

TABLE 5

| Surface number | Radius of curvature (r) | Thickness/ Separation (d) | Refractive Index (Nd) | Abbe number (v) |
|---|---|---|---|---|
| 1 | ∞ | 2.64 | 1.49176 | 57.4 |
| *2 | −13.966 | variable | | |
| 3 | −10.468 | 1.00 | 1.49176 | 57.4 |
| *4 | 9.441 | variable | | |
| *5 | 13.057 | 3.50 | 1.49176 | 57.4 |
| 6 | −10.842 | variable | | |
| 7 | ∞ | 11.00 | | |
| 8 | 14.643 | 4.50 | 1.49176 | 57.4 |
| 9 | ∞ | 4.80 | | |
| 10 | ∞ | 25.40 | 1.49176 | 57.4 |
| 11 | ∞ | 2.45 | | |
| *12 | 25.849 | 2.85 | 1.49176 | 57.4 |
| 13 | −23.123 | 17.00 (EP) | | |
| 14 | ∞ | 0.00 | | | where * indicates an aspherical surface.

In the third embodiment of the present invention, the above-mentioned distances between lenses and the coefficient of the aspherical surface vary according to a view angle as shown in Table 6.

TABLE 6

| | $2\omega = 49.3°$ | | $2\omega = 29.0°$ | | $2\omega = 16.7°$ | |
|---|---|---|---|---|---|---|
| d2 | 2.427 | | 6.976 | | 5.265 | |
| d4 | 15.851 | | 9.768 | | 2.000 | |
| d6 | 4.784 | | 6.312 | | 15.801 | |

| | aspherical coefficient of the 2nd surface | | aspherical coefficient of the 4th surface | |
|---|---|---|---|---|
| K | −0.1259317024141 | | −0.2870085435070E | +1 |
| A4 | 0.1858315927066E | −3 | −0.2833107450246E | −3 |
| A6 | −0.1176991788014E | −5 | −0.1400536083201E | −4 |
| A8 | 0.1886002009861E | −7 | 0.1684781521962E | −5 |
| A10 | −0.2447207585676E | −9 | −0.4876036237906E | −7 |

| | aspherical coefficient of the 5th surface | | aspherical coefficient of the 12th surface | |
|---|---|---|---|---|
| K | −0.1984507564087E | +2 | −0.6890823957758E | +1 |
| A4 | 0.6639650285635E | −3 | 0.0000000000000 | |
| A6 | −0.3759975800986E | −4 | 0.0000000000000 | |
| A8 | 0.1276614221524E | −5 | 0.0000000000000 | |
| A10 | −0.1946339968041E | −7 | 0.0000000000000 | |

Values for conditions in accordance with the first, second, and third embodiments of the present invention are shown in Table 7.

TABLE 7

| condition | the first embodiment | the second embodiment | the third embodiment |
|---|---|---|---|
| $f_3$ | 12.881 | 12.820 | 12.660 |
| $f_4$ | 26.294 | 22.572 | 29.780 |
| L | 47.00 | 46.95 | 45.70 |
| $f_W$ | 9.15 | 8.20 | 9.70 |
| $f_T$ | 27.50 | 24.60 | 29.00 |
| $f_W/f_3$ | 0.710 | 0.640 | 0.766 |
| $L/f_4$ | 1.787 | 2.080 | 1.535 |

As described above, the embodiments of the present invention can provide a real-image variable magnification viewfinder which has an acceptable aberration performance throughout the entire range, from a wide angle position to a telephoto position. In addition, it is possible to produce a real-image variable magnification viewfinder that is compact and low-priced due to the simple construction and inexpensive material being used, respectively.

Also, using relatively simple-shaped lenses and minimizing the use of aspherical surfaces makes manufacturing the real-image variable magnification viewfinder easier, thus improving the productivity of the real-image variable magnification viewfinder.

While it has been shown and described what are at present the embodiments of the invention, it will be obvious to those skilled in the art that various changes and modifications can be readily made therein without departing from the scope and spirit of the invention as defined by the appended claims.

What is claimed is:

1. A real-image variable magnification viewfinder comprising:

an objective lens group having an overall positive power, including, from an object side, a first lens unit of a positive refractive power, a second lens unit of a negative refractive power, a third lens unit of a positive refractive power and a fourth lens unit of a positive refractive power, wherein the objective lens group forms an actual image of an object;

a reverse lens group for reversing the image formed by the objective lens group; and an eyepiece lens group for observing the image reversed by the reverse lens group;

wherein magnification is changed by moving the second lens unit and the third lens unit along an optical axis of the viewfinder while the first lens unit and fourth lens unit are fixed, and wherein the real-image variable magnification viewfinder fulfills the following conditions:

$$0.6 < f_W/f_3 < 1.0;$$

and $$18 < f_T < 33,$$

where $f_W$ represents the focal length of the objective lens group at a wide angle position, $f_3$ represents the focal length of the third lens unit, and $f_T$ represents the focal length of the objective lens group at a telephoto position.

2. The real-image variable magnification viewfinder of claim 1, wherein the real-image variable magnification viewfinder further fulfills the following condition:

$$1.0 < L/f_4 < 2.1,$$

where L represents the distance between the surface of the first lens of the objective lens group on the object side and an image plane, and $f_4$ represents the focal length of the fourth lens unit.

* * * * *

UNITED STATES PATENT AND TRADEMARK OFFICE
CERTIFICATE OF CORRECTION

PATENT NO.    : 5,771,119
DATED         : June 23, 1998
INVENTOR(S)   : Hyoung-won KANG It is certified that error appears in the above-indentified patent and that said Letters Patent is hereby corrected as shown below:

Title Page, Item [75], in the Inventor, line 2, "Syeongsangnam-do" should read --Kyeongsangnam-do--.

Signed and Sealed this

Twenty-second Day of June, 1999

*Attest:*

Q. TODD DICKINSON

*Attesting Officer*    *Acting Commissioner of Patents and Trademarks*